US012722608B2

(12) United States Patent
Ishizuka

(10) Patent No.: US 12,722,608 B2
(45) Date of Patent: Sep. 1, 2026

(54) BRAKE CONTROL METHOD AND BRAKE CONTROL DEVICE

(71) Applicant: Nissan Motor Co., Ltd., Kanagawa (JP)

(72) Inventor: Motoi Ishizuka, Kanagawa (JP)

(73) Assignee: Nissan Motor Co., Ltd., Kanagawa (JP)

(*) Notice: Subject to any disclaimer, the term of this patent is extended or adjusted under 35 U.S.C. 154(b) by 121 days.

(21) Appl. No.: 18/730,973

(22) PCT Filed: Jan. 25, 2022

(86) PCT No.: PCT/JP2022/002690
§ 371 (c)(1),
(2) Date: Jul. 22, 2024

(87) PCT Pub. No.: WO2023/144890
PCT Pub. Date: Aug. 3, 2023

(65) Prior Publication Data
US 2025/0100521 A1 Mar. 27, 2025

(51) Int. Cl.
*B60T 8/172* (2006.01)
*B60T 8/1761* (2006.01)
*B60T 8/32* (2006.01)

(52) U.S. Cl.
CPC .......... *B60T 8/172* (2013.01); *B60T 8/17616* (2013.01); *B60T 8/32* (2013.01); *B60T 2210/12* (2013.01)

(58) Field of Classification Search
CPC ............... B60T 13/741; B60T 2201/03; B60T 2201/06; B60T 2210/12; B60T 2230/04; B60T 7/042; B60T 7/122; B60T 8/172; B60T 8/17616; B60T 8/32
See application file for complete search history.

(56) References Cited

U.S. PATENT DOCUMENTS 5,213,398 A * 5/1993 Becker ................ B60T 8/17616 303/157
5,251,968 A * 10/1993 Rath ....................... B60T 7/107 303/113.5
5,884,986 A * 3/1999 Shimizu ................ B60T 8/4275 303/122.1
12,276,313 B2 * 4/2025 Kim ...................... F16D 66/021
2009/0138169 A1 * 5/2009 Uematsu ................. B60T 8/176 701/93
2010/0332098 A1 * 12/2010 Kato ...................... B60T 8/246 701/72

(Continued)

FOREIGN PATENT DOCUMENTS

JP 2008-149747 A 7/2008

*Primary Examiner* — Carl C Staubach
(74) *Attorney, Agent, or Firm* — Osha Bergman Watanabe & Burton LLP

(57) ABSTRACT

A brake control method includes: determining whether the acceleration amount in a brake release operation of a vehicle is equal to or larger than the deceleration amount in a brake operation of the vehicle when a parking brake device that is driven by a motor performs braking control with anti-lock control for alternately repeating the brake operation and the brake release operation while the vehicle is travelling; and restricting the anti-lock control from being performed when the acceleration amount is equal to or larger than the deceleration amount.

8 Claims, 8 Drawing Sheets

(56) References Cited

U.S. PATENT DOCUMENTS

| | | | | |
|---|---|---|---|---|
| 2017/0291585 | A1* | 10/2017 | Kobune | F16D 55/226 |
| 2018/0257644 | A1* | 9/2018 | Morotomi | G05D 1/0246 |
| 2021/0387602 | A1* | 12/2021 | Witte | B60T 7/107 |
| 2024/0336244 | A1* | 10/2024 | Park | B60T 8/92 |

* cited by examiner

FIG. 3

VEHICLE SPEED

CREEP TORQUE

EPB BRAKING FORCE

VEHICLE SPEED

CREEP TORQUE

EPB BRAKING FORCE

V1

V

T

VEHICLE SPEED
CREEP TORQUE
EPB BRAKING FORCE
DP
V
V1
T
T1
t1
t2

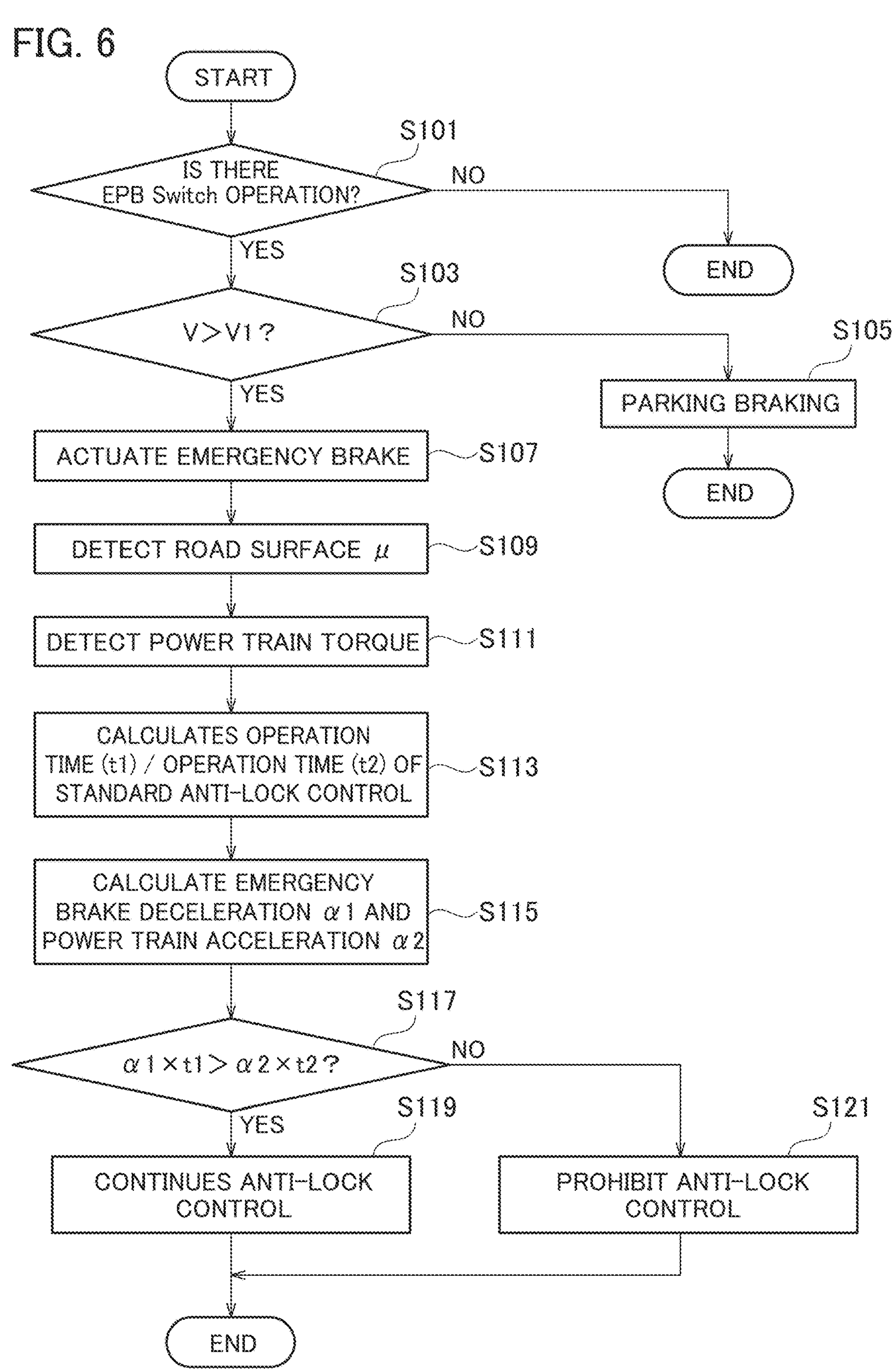
FIG. 6
START
S101
IS THERE
EPB Switch OPERATION?
NO
YES
END
S103
V>V1 ?
NO
S105
YES
PARKING BRAKING
END
ACTUATE EMERGENCY BRAKE
S107
DETECT ROAD SURFACE μ
S109
DETECT POWER TRAIN TORQUE
S111
CALCULATES OPERATION
TIME (t1) / OPERATION TIME (t2) OF
STANDARD ANTI-LOCK CONTROL
S113
CALCULATE EMERGENCY
BRAKE DECELERATION α1 AND
POWER TRAIN ACCELERATION α2
S115
S117
α1×t1>α2×t2 ?
NO
YES
S119
S121
CONTINUES ANTI-LOCK
CONTROL
PROHIBIT ANTI-LOCK
CONTROL
END

FIG. 11

VEHICLE SPEED

CREEP TORQUE

EPB BRAKING FORCE

V

Vt2

V1

T

Ra t1 t2

BRAKE CONTROL METHOD AND BRAKE CONTROL DEVICE

TECHNICAL FIELD

The present invention relates to a brake control method and brake control device.

BACKGROUND ART

Patent Literature 1 discloses a brake control method for a vehicle having an anti-lock control mechanism. A motor-driven parking brake device disclosed in Patent Literature 1 is referred to as an Electronic Parking Brake (EPB). The EPB converts the rotation of a motor into a linear movement and transmits the movement to a brake pad to move the brake pad, and the brake pad is close to or away from a brake rotor. This applies a brake to a vehicle or releases the brake.

CITATION LIST

Patent Literature

[Patent Literature 1] JP 2008-149747 A

SUMMARY OF THE INVENTION

Problems to be Solved

Since the EPB moves the brake pad by the rotation of the motor, the EPB has the control responsiveness which is lower than that of a Vehicle Dynamics Control (VDC) which moves a brake pad by a cylinder. The EPB has a function of performing anti-lock control as an emergency brake when the vehicle is travelling in addition to a parking brake when the vehicle is stopping, which is a main function. However, if the EPB performs braking control with the anti-lock control, a time period of a brake release operation in the anti-lock control is prolonged. If a friction coefficient of a travelling road is low and the deceleration by the brake decreases, there is a possibility that the vehicle is re-accelerated due to a creep torque during the time period of the brake release operation in the anti-lock control.

The present invention has been devised in view of the above described circumstances, and an object of the present invention is to suppress re-acceleration of a vehicle during braking control with the anti-lock control by a motor-driven parking brake device.

Solution to Problem

In order to solve the problems described above, in a brake control method according to one aspect of the present invention, it is determined whether the acceleration amount in a brake release operation of a vehicle is equal to or larger than the deceleration amount in a brake operation of the vehicle. The brake release operation and brake operation of the vehicle are alternately repeated while the vehicle is travelling in the braking control with the anti-lock control performed by a motor-driven parking brake device. During the performance of the braking control with the anti-lock control, it is determined whether the acceleration amount of the vehicle in the brake release operation is equal to or larger than the deceleration amount of the vehicle in the brake operation, and when the acceleration amount is equal to or larger than the deceleration amount, the performance of the anti-lock control is restricted.

Advantageous Effects

According to the present invention, it is possible to suppress re-acceleration of a vehicle during braking control with the anti-lock control by a motor-driven parking brake device.

BRIEF DESCRIPTION OF THE DRAWINGS

FIG. 3 is a graph showing an example of the time variation of a vehicle speed, a creep torque from a power train, and braking force by an emergency brake when anti-lock control during an emergency brake is performed when a vehicle is travelling on a high-μ road.

FIG. 4 is a graph showing an example of the time variation of a vehicle speed, a creep torque from a power train, and braking force by an emergency brake when anti-lock control during an emergency brake is performed when a vehicle is travelling on a low-μ road.

FIG. 6 is a flowchart showing an example of a procedure when the ECU in FIG. 1 performs the brake control method of the first embodiment.

FIG. 11 is a graph showing an example of the time variation of a vehicle speed, a creep torque from a power train, and braking force by an emergency brake when the ECU in FIG. 1 performs anti-lock control by the brake control method of the fifth embodiment during an emergency brake when a vehicle is travelling on a low-μ road.

DESCRIPTION OF EMBODIMENTS

Figure 1:
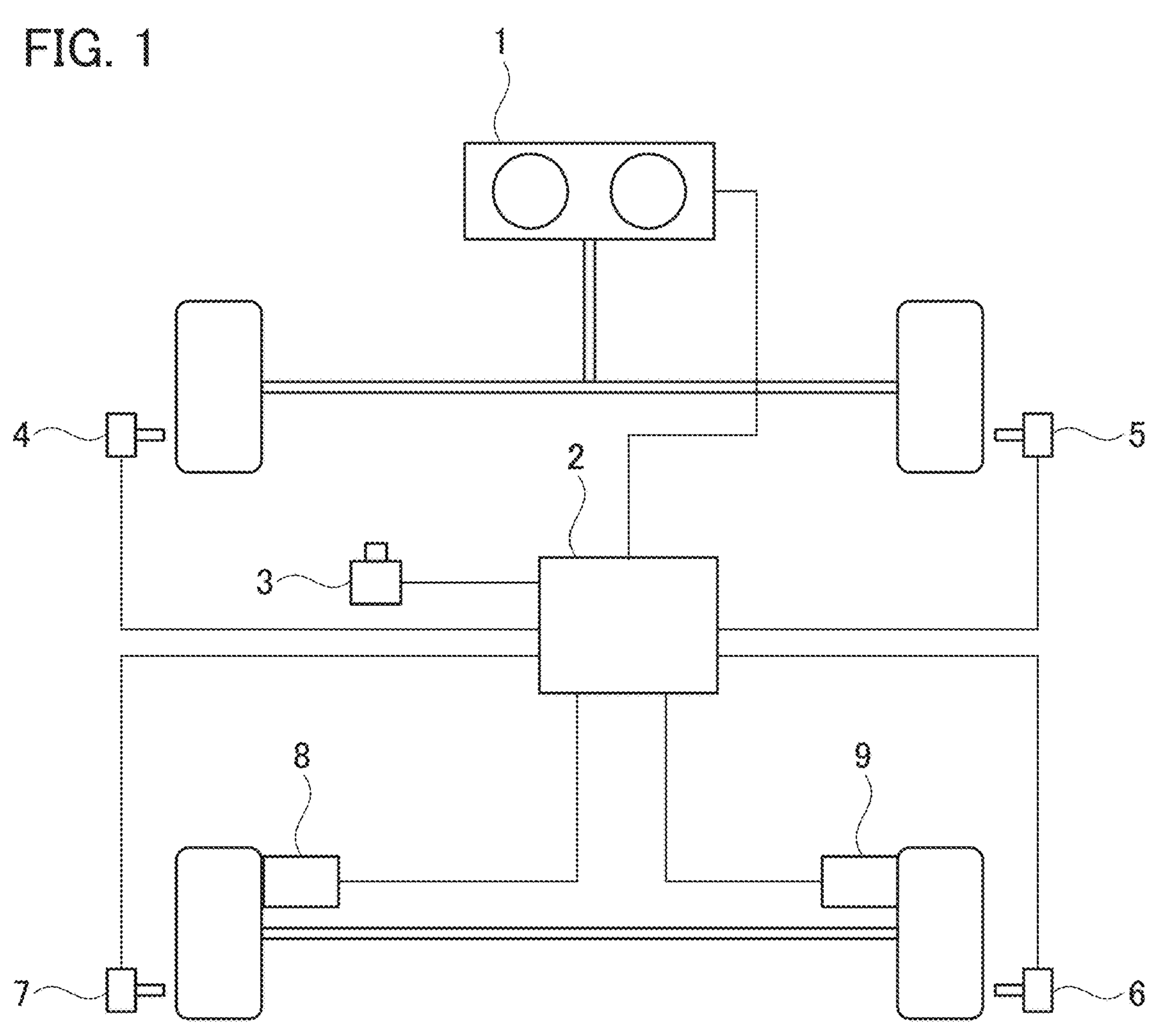
FIG. 1 is a diagram showing a configuration example of a main part of a vehicle mounted with a parking brake device to which a brake control method according to a first embodiment of the present invention is applied.

With reference to the drawings, a description will be given regarding specific examples to which embodiments and modified examples thereof, or embodiments or modified examples thereof are applied. In the drawings, the same parts are denoted by the same reference numerals and the description thereof will be omitted.

First Embodiment

With reference to FIG. 1, a description will be given regarding a configuration example of a main part of a vehicle mounted with a parking brake device to which a brake control method according to a first embodiment of the present invention is applied.

A vehicle shown in FIG. 1 travels with four wheels as front right and left and rear right and left wheels (not shown) driven by the power of a power train 1. The power train 1 may have an electric power source such as a motor or a power source by an internal combustion engine such as a reciprocating engine, for example. FIG. 1 shows an example in which front two wheels are driven by the power of the power train 1. Wheels driven by the power of the power train 1 may be rear two wheels or all of the four wheels.

When a brake for the wheels is released, even if a user does not step on an accelerator pedal, the vehicle in FIG. 1 moves due to the creep phenomenon. When the power train 1 uses an engine (not shown) and a clutch mechanism (not shown) with a fluid coupling, the creep phenomenon occurs due to a creep torque transmitted from the engine in an idling state to the wheels via the clutch mechanism.

The creep phenomenon does not occur in a vehicle in which a fluid coupling is not used for a clutch mechanism, an electric vehicle (EV) in which a source other than an engine is used as a power source of the power train 1, and the like in terms of structures, for example. In a vehicle in which the creep phenomenon does not occur, wheels may be driven with a low torque generated in the power train 1 by the control during brake release and a pseudo creep phenomenon may be generated. In the following embodiment, it is assumed that a torque generated in the power train 1 for the pseudo creep phenomenon is included in the creep torque category. A value of the creep torque may be detected by a sensor or the like, or calculated or estimated.

The vehicle shown in FIG. 1 has a motor-driven parking brake device. The parking brake device has an Electronic Control Unit (ECU) 2, a switch 3, wheel speed sensors 4 to 7 corresponding to front right and left and rear right and left wheels (not shown), and actuators 8 and 9 corresponding to rear two wheels.

The ECU 2 can be implemented using a microcomputer, for example. The microcomputer may include a central processing unit (CPU), a memory, and an output unit.

By installing a computer program in the memory of the microcomputer and causing the CPU to execute the program, the ECU 2 can constitute a brake control device that functions as an information processing unit and includes a determining unit and a restricting unit, which will be described later.

The present embodiment shows an example in which information processing performed by each information processing unit of the motor-driven parking brake device is implemented by software. It is also possible to prepare dedicated hardware for performing information processing of each information processing unit and constitute each information processing unit. The dedicated hardware may include devices such as an application specific integrated circuit (ASIC) and conventional circuit components that are arranged to perform functions described in the embodiment described below.

After a sensor (not shown) detects that an occupant in a vehicle has operated the switch 3 in the vehicle, the ECU 2 calculates the vehicle speed from the speed of the vehicle's four wheels detected by the front right and left and rear right and left wheel speed sensors 4 to 7. The switch 3 can be a lever-type switch arranged in a center console in the vehicle together with a shift lever, for example. An occupant operating the switch 3 can be a driver in a driver's seat or a passenger in a passenger seat.

When the vehicle speed calculated in response to the operation of the switch 3 is a stop determination speed V1 or lower and the ECU 2 determines that the vehicle is in a stopped state, the ECU 2 actuates the actuators 8 and 9 and applies brakes to the rear two wheels.

Figure 2:
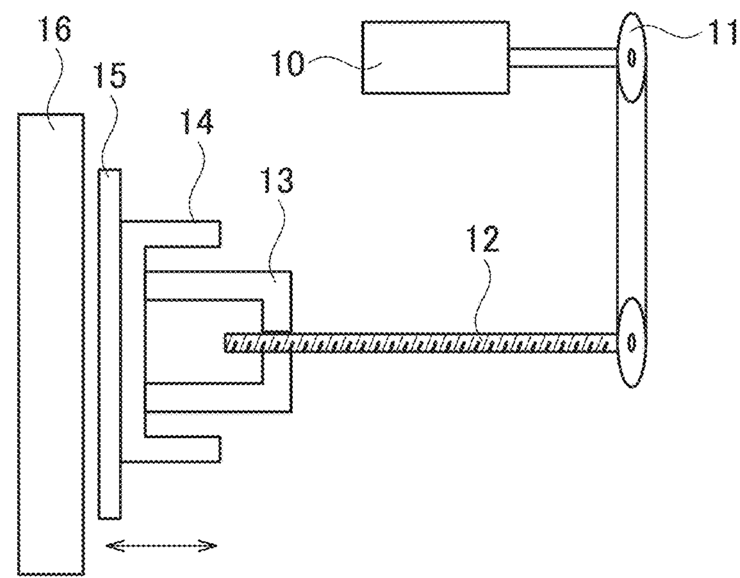
FIG. 2 is a diagram showing an example of a configuration of an actuator of FIG. 1.

As shown in FIG. 2, each of the actuators 8 and 9 has a motor 10, a reduction gear 11, a feed screw 12, a nut 13, and a piston 14. In each of the actuators 8 and 9, when the motor 10 rotates the feed screw 12 with the reduction gear 11 therebetween, the nut 13 engaged with the feed screw 12 moves the piston 14 linearly in an axial direction of the feed screw 12. The piston 14 moves a brake pad 15 close to or away from a brake rotor 16 by the linear movement of the feed screw 12 in the axial direction.

When the brake pad 15 is pressed to the brake rotor 16, brakes can be applied to the rear two wheels of the vehicle with the braking force corresponding to the pressing force of the brake pad 15 to the brake rotor 16. When the piston 14 is moved linearly by rotating the feed screw 12 and the pressing force of the brake pad 15 to the brake rotor 16 is changed, the braking force of the brakes applied to the rear two wheels can be increased or decreased. When the brake pad 15 is away from the brake rotor 16, the brakes applied to the rear two wheels can be released.

When the ECU 2 in FIG. 1 determines that the vehicle is in a stopped state and actuates each of the actuators 8 and 9, and if the braking force of the brakes applied to the rear two wheels reaches the parking braking force necessary for maintaining the stopped state of the vehicle, the ECU 2 stops the actuation of each of the actuators 8 and 9. By stopping the actuation of each of the actuators 8 and 9, a state can be maintain in which the brakes of the parking braking force are applied to the rear two wheels.

When the vehicle speed calculated in response to the operation of the switch 3 is higher than the stop determination speed V1 and the ECU 2 determines that the vehicle is in a travelling state, the ECU 2 determines that an occupant has operated the switch 3 in order to start the emergency brake control to apply a brake to the travelling vehicle. The operation of the switch 3 performed by the occupant corresponds to an operation of the parking brake device performed by the occupant.

In the case of performing emergency brake control to the travelling vehicle, the ECU 2 actuates each of the actuators 8 and 9 until the braking force of the brakes applied to the rear two wheels is prescribed braking force, unlike the case of performing control of applying a brake of the parking braking force to the vehicle in a stopped state. The ECU 2 continues the actuation of each of the actuators 8 and 9 for applying the brakes to the rear two wheels while the occupant operates the switch 3 in the travelling vehicle.

When the ECU 2 detects that the rear two wheels are locked from the wheel speed detected by the wheel speed sensors 6 and 7 during the emergency brake control, the ECU 2 performs the emergency brake control as the braking control with the anti-lock control. In the emergency brake control with the anti-lock control, the ECU 2 intermittently actuates each of the actuators 8 and 9 and makes the motor-driven parking brake device alternately and repeatedly perform a brake operation and brake release operation.

In the brake operation, the ECU 2 sets the braking force of the brakes applied to the rear two wheels to prescribed braking force. In the brake release operation, the ECU 2 sets the braking force of the brakes applied to the rear two wheels to zero and releases emergency brakes applied to the rear two wheels.

The ECU 2 shown in FIG. 1 calculates the vehicle speed during emergency brake control from the wheel speed detected by the wheel speed sensors 4 to 7. If the vehicle speed during emergency brake control is the stop determination speed V1 or lower, and if the ECU 2 determines that the vehicle is in a stopped state, the ECU 2 actuates the actuators 8 and 9 until the stopped state is reached in which brakes of the parking braking force are applied to the rear two wheels, and stops actuation of the actuators 8 and 9 in the stopped state. When the ECU 2 detects that the occupant has stopped the operation of the switch 3 before the vehicle speed during emergency brake control is the stop determination speed V1 or lower, the ECU 2 actuates the actuators 8 and 9 until there is no braking force applied to the rear two wheels to release the brakes and ends emergency brake control.

During emergency brake control with the anti-lock control, the actuators 8 and 9 convert the rotation of the motor 10 shown in FIG. 2 into a linear movement and move the brake pad 15 each time the parking brake device alternately repeats the brake operation and brake release operation. The responsiveness of the anti-lock control in which the parking brake device repeats the brake operation and brake release operation is extremely lower than that of the control in which the brake pad 15 is moved by a cylinder or the like that moves linearly.

If the responsiveness of the anti-lock control is low, compared to when the responsiveness is high, the time increases which is required to return a state of the parking brake device performing the brake release operation to a state of the parking brake device performing the brake operation, the start of the brake operation is delayed, and the deceleration of the vehicle during emergency brake control is reduced.

Figure 3:
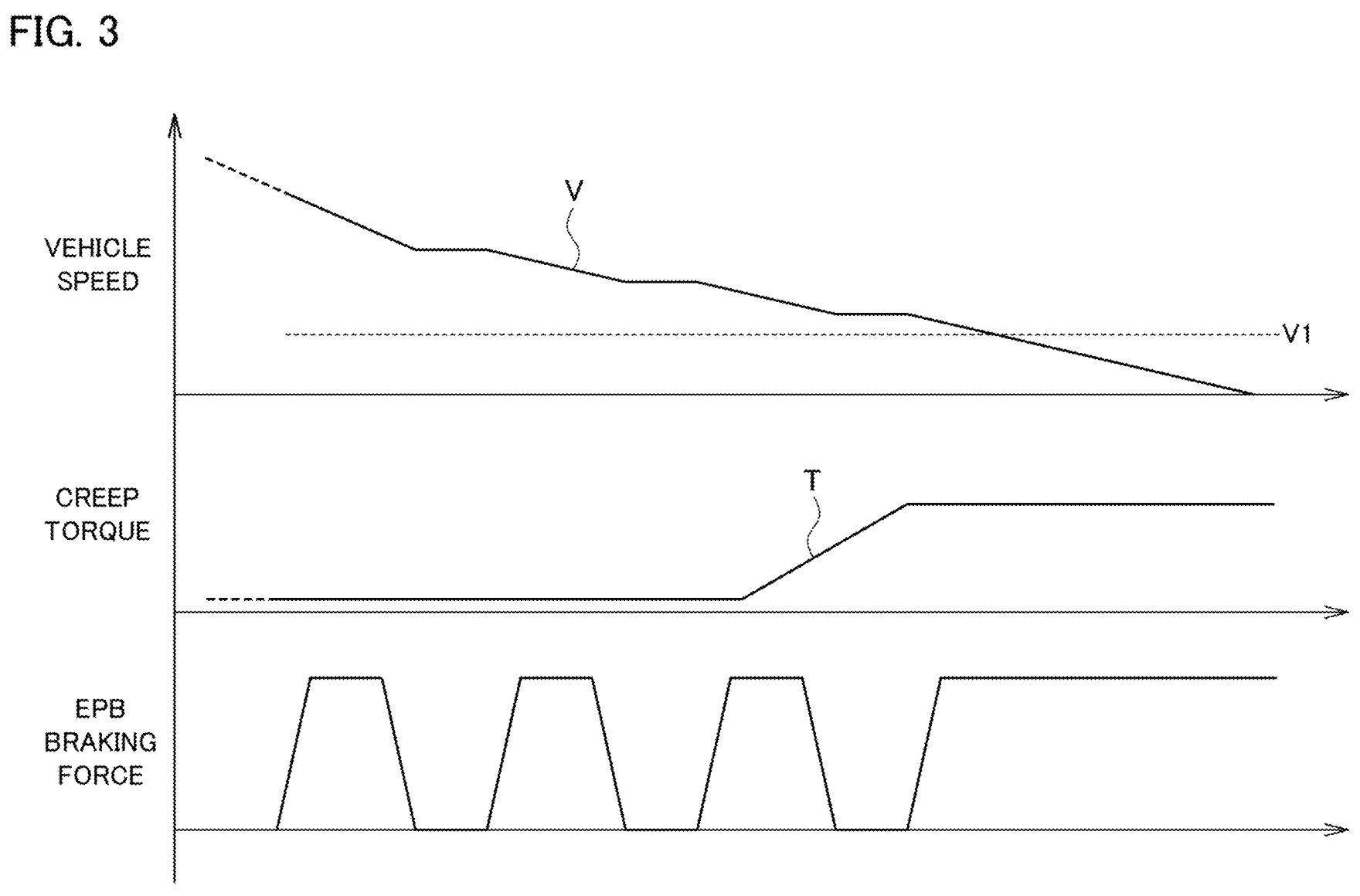

On a high-μ road with a high friction coefficient with a tire, even if the deceleration of the vehicle during emergency brake control decreases, the braking force of the parking brake device (EPB braking force) shown in the lower graph of FIG. 3 acts during the brake operation, and the vehicle decelerates at a deceleration larger than that on a low-μ road with a low friction coefficient. Since a vehicle on the high-μ road decelerates at a deceleration larger than that of a vehicle on the low-μ road, a vehicle speed V does not increase even if a creep torque T shown in the middle graph of FIG. 3 is generated due to a decrease in the vehicle speed V and transmitted to the wheels during the brake release operation.

Since the vehicle speed V does not increase due to the creep torque T on the high-μ road, due to the EPB braking force during the brake operation, the vehicle speed V decreases to a speed which is equal to or lower than the stop determination speed V1 as shown in the upper graph of FIG. 3. On the high-μ road, even if the emergency brake control with the anti-lock control is performed, the vehicle can be in a stopped state at an appropriate speed. When the vehicle is in the stopped state, as shown in the lower graph of FIG. 3, the magnitude of the EPB braking force is maintained at the parking braking force.

Figure 4:
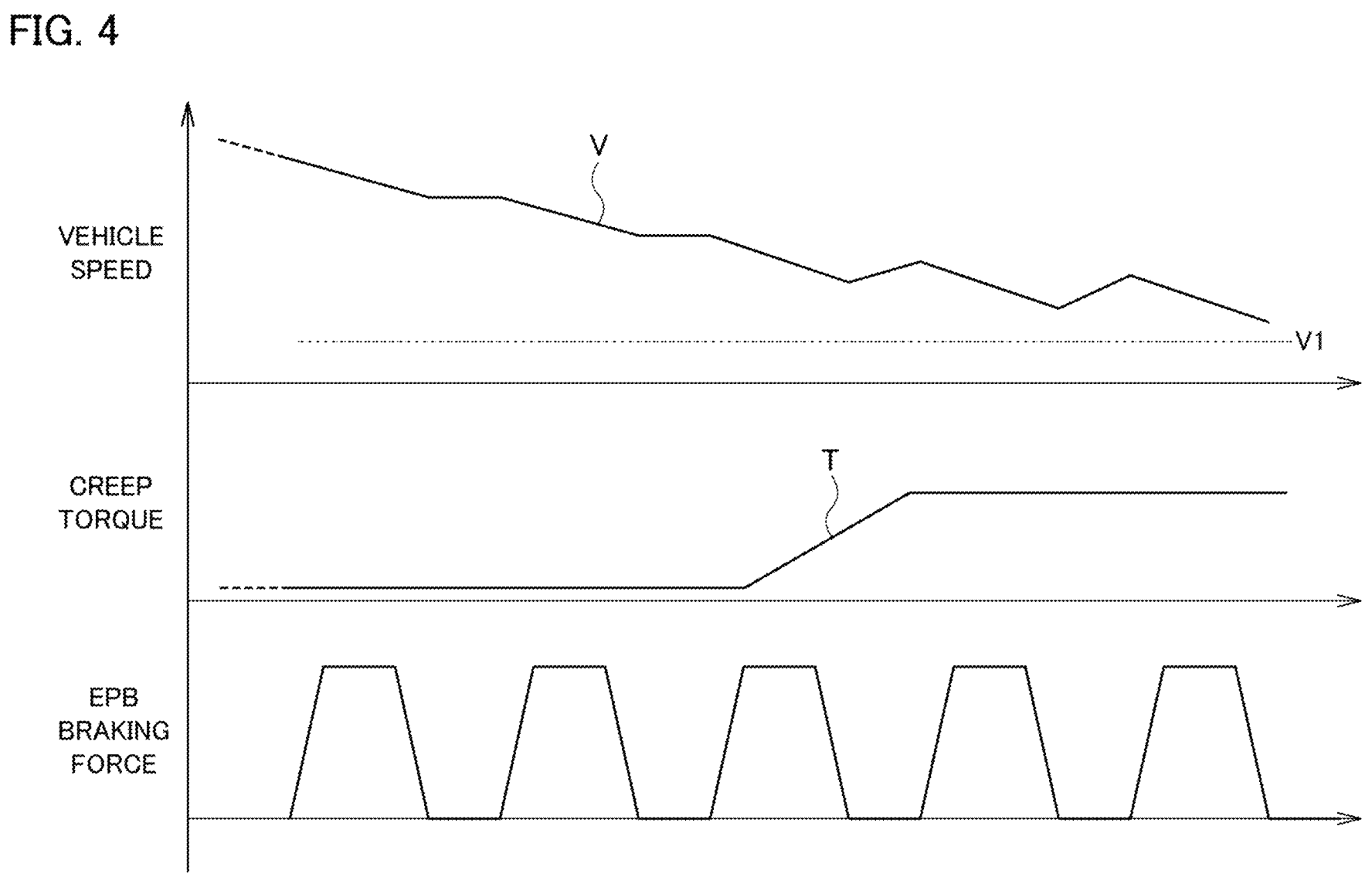

On the low-μ road, when the deceleration of the vehicle during emergency brake control decreases, even if the EPB braking force shown in the lower graph of FIG. 4 acts during the brake operation, the deceleration of the vehicle becomes smaller than that of the high-μ road, as shown in the upper graph of FIG. 4. A vehicle on the low-μ road decelerates at a deceleration smaller than that of a vehicle on the high-μ road, and therefore if the creep torque T shown in the middle graph of FIG. 4 is generated due to a decrease in the vehicle speed V and transmitted to the wheels during the brake release operation, the vehicle speed V increases.

On the low-μ road, the vehicle speed V increases due to the creep torque T, and therefore the vehicle speed V is less likely to decrease to a speed which is equal to or lower than the stop determination speed V1 shown in the upper graph of FIG. 4 with the EPB braking force during the brake operation. When the emergency brake control with the anti-lock control is performed while the vehicle is travelling on the low-μ road, it is assumed that it takes time for the vehicle to be in a stopped state, and it becomes difficult for the vehicle to be in the stopped state at an appropriate speed.

The ECU 2 of the present embodiment restricts the anti-lock control from being performed when the acceleration amount in the brake release operation of the vehicle is equal to or larger than the deceleration amount in the brake operation of the vehicle during the emergency brake control with the anti-lock control.

Figure 5:
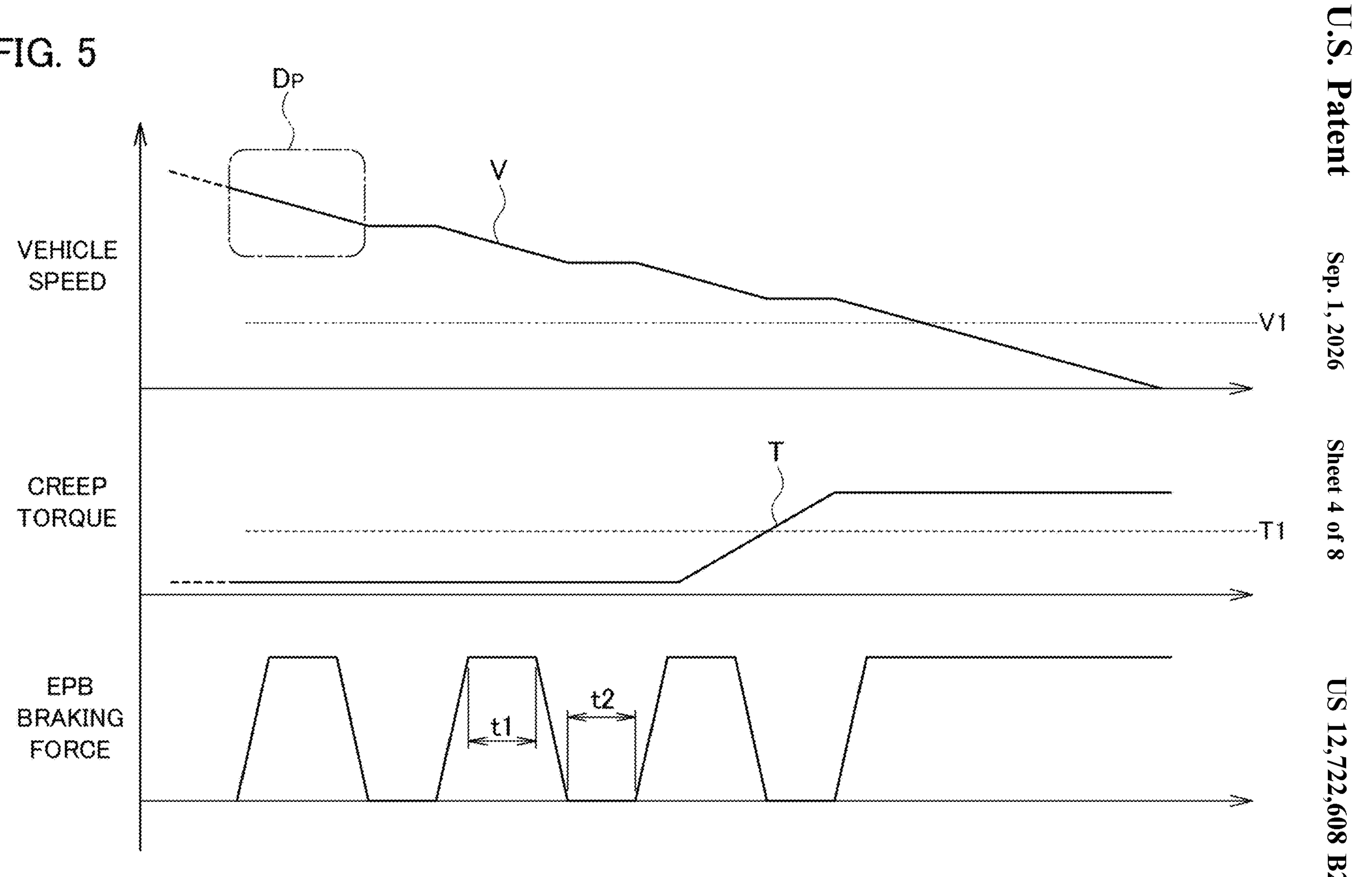
FIG. 5 is a graph showing an example of the time variation of a vehicle speed, a creep torque from a power train, and braking force by an emergency brake when an ECU in FIG. 1 performs anti-lock control by the brake control method of the first embodiment during an emergency brake when a vehicle is travelling on a low-μ road.

The acceleration amount in the brake release operation of the vehicle can be determined based on an acceleration α2 in the brake release operation of the vehicle and an operation time t2 of the brake release operation in the EPB braking force shown in the lower graph of FIG. 5, for example. The operation time t2 of the brake release operation is the time of the brake release operation in one cycle of the anti-lock control. The acceleration α2 of the brake release operation of the vehicle is the acceleration when the creep torque T shown in the middle graph in FIG. 5 is transmitted to the wheels during the brake release operation and the vehicle speed V increases.

In the present embodiment, the ECU 2 calculates the acceleration amount **α2*t2 in the brake release operation of the vehicle by multiplying the acceleration α2 in the brake release operation of the vehicle and the operation time t2 of the brake release operation. The operation time t2 of the brake release operation may be the length of a brake release operation when anti-lock control is performed under standard conditions, or may be a prescribed length of the brake release operation, for example. The acceleration amount in the brake release operation of the vehicle may be obtained by a method other than the multiplication of the acceleration α2 in the brake release operation of the vehicle and the operation time t2** of the brake release operation.

The deceleration amount in the brake operation of the vehicle may be obtained based on an operation time t1 of a brake operation in the EPB braking force shown in the lower graph of FIG. 5 and a deceleration al in the brake operation of the vehicle, for example. The operation time t1 of the brake operation is the time of the brake operation in one cycle of the anti-lock control. The deceleration al of the brake operation of the vehicle is the deceleration when the vehicle speed V decreases due to the EPB braking force acting during the brake operation.

In the present embodiment, the ECU 2 calculates the deceleration amount **α1*t1 in the brake operation of the vehicle by multiplying the deceleration α1 in the brake operation of the vehicle and the operation time t1 of the brake operation. The operation time t1** of the brake operation may be the length of a brake operation when anti-lock control is performed under standard conditions, or may be a prescribed length of the brake operation, for example. The deceleration amount in the brake operation of the vehicle may be determined by a method other than the multiplication of the deceleration $\alpha 1$ in the brake operation of the vehicle and the operation time t1 of the brake operation.

In the present embodiment, the ECU 2 stops the brake release operation and continues the brake operation while the performance of the anti-lock control is restricted. When the performance of the anti-lock control is restricted and the brake operation is continued, there is no increase in the vehicle speed V during the brake release operation due to the creep torque T generated by the decrease in the vehicle speed V. Since there is no increase in the vehicle speed V due to the creep torque T, the vehicle speed V is lowered to a speed which is equal to or lower than the stop determination speed V1 by the EPB braking force during the brake operation, as shown in the upper graph of FIG. 5.

On the high-μ road, since the vehicle speed V does not increase even if the creep torque T is transmitted to the wheels during the brake release operation, it is meaningful to continue the anti-lock control without restricting it even if the acceleration amount in the brake release operation of the vehicle is equal to or larger than the deceleration amount in the brake operation. The restriction of the anti-lock control when the acceleration amount in the brake release operation of the vehicle is equal to or larger than the deceleration amount in the brake operation may be made only when a road surface on which the vehicle is travelling is the low-μ road.

Whether a road surface on which the vehicle is travelling is the low-μ road can be determined based on a friction coefficient μ of the road surface. The friction coefficient μ of the road surface can be detected based on the inclination of the vehicle speed V when the ECU 2 starts emergency brake control, for example. The frame in the upper graph of FIG. 5 shows an example of a detection period Dp of the vehicle speed V used for detecting the friction coefficient μ.

The friction coefficient μ of the travelling road surface may be detected by means of calculation based on the EPB braking force and the speed of driving wheels detected by the wheel speed sensors 4 and 5 of the front two wheels during the detection period Dp. The friction coefficient μ of the travelling road surface may be detected by means of estimation based on the EPB braking force and the acceleration of the vehicle detected by acceleration sensors (not shown) during the detection period Dp. Methods for obtaining the friction coefficient μ of the travelling road surface are not limited to the methods described above.

A description will be given regarding an example of a procedure when the ECU 2 performs the brake control method according to the present embodiment with reference to a flowchart of FIG. 6. The ECU 2 determines whether an operation of the switch 3 by the occupant of the vehicle has been detected with a sensor (not shown) (Is there EPB switch operation?) (step S101), and if the operation of the switch 3 has not been detected (NO in step S101), ends the series of processing. Alternatively, if the operation of the switch 3 has been detected (YES in step S101), the ECU 2 determines whether the vehicle speed V is higher than the stop determination speed V1 (step S103).

If the vehicle speed V is not higher than the stop determination speed V1 (NO in step S103), the ECU 2 performs parking braking (step S105), applies parking braking force to the rear two wheels with the actuators 8 and 9, and then ends the series of processing. Alternatively, if the vehicle speed V is higher than the stop determination speed V1 (YES in step S103), the ECU 2 starts performing emergency brake control and actuates the actuators 8 and 9 such that prescribed braking force of emergency brakes is applied (step S107).

The ECU 2 detects the friction coefficient μ of the travelling road surface (step S109) and detects the creep torque T of the power train 1 (step S111). The creep torque T can be detected by means of calculation based on a control value for instructing an output of the power train 1, for example. The ECU 2 calculates operation times t1 and t2 of a standard brake operation and brake release operation, respectively (step S113). The operation times t1 and t2 of the standard brake operation and brake release operation, respectively may be determined in advance and stored in a memory (not shown) of the ECU 2, for example. The order of steps S109 to S113 may be changed.

The ECU 2 calculates the deceleration (emergency brake deceleration) $\alpha 1$ in the brake operation of the vehicle and the acceleration (power train acceleration) $\alpha 2$ in the brake release operation of the vehicle (step S115). The deceleration $\alpha 1$ in the brake operation of the vehicle is the deceleration by the EPB braking force acting during the brake operation on the road surface having the friction coefficient μ detected in step S109. The acceleration $\alpha 2$ of the vehicle is the acceleration during the brake release operation by the creep torque T detected in step S111.

The ECU 2 determines whether the deceleration amount $\alpha 1 * t1$ in the brake operation of the vehicle is larger than the acceleration amount $\alpha 2 * t2$ in the brake release operation of the vehicle (step S117). If the deceleration amount $\alpha 1 * t1$ of the vehicle is larger than the acceleration amount $\alpha 2 * t2$ (YES in step S117), the ECU 2 determines that the acceleration amount $\alpha 2 * t2$ is not equal to or larger than the deceleration amount $\alpha 1 * t1$, continues the anti-lock control (step S119), and ends the series of processing. Alternatively, if the deceleration amount $\alpha 1 * t1$ of the vehicle is not larger than the acceleration amount $\alpha 2 * t2$ (NO in step S117), the ECU 2 determines that the acceleration amount $\alpha 2 * t2$ is equal to or larger than the deceleration amount $\alpha 1 * t1$, prohibits the anti-lock control (step S121), and ends the series of processing.

If the ECU 2 has already performed emergency brake control with the anti-lock control, the ECU 2 continues the anti-lock control being performed in step S119. When the ECU 2 has not performed the emergency brake control with the anti-lock control, the ECU 2 continues the anti-lock control by setting a permission flag to be on which is for permitting the anti-lock control in step S119.

The permission flag can be a flag referred to by the ECU 2 when conditions for performing the emergency brake control with the anti-lock control are satisfied, for example. The ECU 2 performs the emergency brake control with the anti-lock control when the referenced permission flag is set to be on. Even if the conditions for performing the emergency brake control with the anti-lock control are satisfied, if the permission flag referenced at that time is not set to be on, the ECU 2 does not perform the emergency brake control with the anti-lock control.

If the ECU 2 has already performed the emergency brake control with the anti-lock control, the ECU 2 prohibits the anti-lock control by stopping the anti-lock control being performed in step S121. If the ECU 2 has not performed the emergency brake control with the anti-lock control, the ECU 2 prohibits the anti-lock control by setting the permission flag to be off in step S121.

The ECU 2 may determine whether the deceleration amount $\alpha 1 * t1$ of the vehicle is larger than the acceleration amount $\alpha 2 * t2$ in step S117 by determining whether the creep torque T detected in step S111 is equal to or smaller than a torque threshold T1 shown in the middle graph of FIG. 5. The torque threshold T1 may be determined based on a value of a deceleration torque acting on the vehicle at a deceleration by the EPB braking force and a ratio between the operation time t1 of the standard operation and the operation time t2 of the brake release operation, for example. The deceleration torque of the vehicle by the EPB braking force may be determined based on the deceleration amount of the vehicle by the EPB braking force and the known vehicle weight, for example.

If the creep torque T detected in step S111 is equal to or smaller than the torque threshold T1, the ECU 2 can determine that the deceleration amount $\alpha 1$*t1 of the vehicle is larger than the acceleration amount $\alpha 2$*t2 and that the acceleration amount $\alpha 2$*t2 is not equal to or larger than the deceleration amount $\alpha 1$*t1. If the creep torque T detected in step S111 is not equal to or smaller than the torque threshold T1, the ECU 2 can determine that the deceleration amount $\alpha 1$*t1 of the vehicle is not larger than the acceleration amount $\alpha 2$*t2 and that the acceleration amount $\alpha 2$*t2 is equal to or larger than the deceleration amount $\alpha 1$*t1.

The ECU 2 can function as a determining unit by performing the processing in step S117 of FIG. 6. The ECU 2 can function as a restricting unit by performing the processing in steps S119 and S121 depending on a determination result in step S117.

In the present embodiment, the ECU 2 determines whether the acceleration amount $\alpha 2$*t2 is equal to or larger than the deceleration amount $\alpha 1$*t1 by determining whether the deceleration amount $\alpha 1$*t1 in the brake operation of the vehicle is larger than the acceleration amount $\alpha 2$*t2 in the brake release operation of the vehicle. Based on a determination result, the ECU 2 determines a scene in which re-acceleration of the vehicle is assumed in the emergency brake control with the anti-lock control. The anti-lock control is prohibited in the scene in which re-acceleration of the vehicle is assumed, and re-acceleration of the vehicle is prevented.

When the ECU 2 prohibits the anti-lock control in the scene in which re-acceleration of the vehicle is assumed, a lock state is released by the continuation of the anti-lock control on the high-μ road, and the stoppability of the vehicle by the emergency brake control is enhanced by the prohibition of the anti-lock control on the low-μ road. In the brake control method of the present embodiment, it is possible to achieve both enhancement of the vehicle behavior on the high-μ road and enhancement of the stoppability of the vehicle on the low-μ road.

In the brake control method of the present embodiment, it is possible to prevent the re-acceleration of the vehicle during the emergency brake control with the anti-lock control performed by the motor-driven parking brake device by the ECU 2 performing the processing of the procedure of FIG. 6 to perform the brake control method according to the present embodiment. By suppressing the re-acceleration of the vehicle during the emergency brake control, a speed of the vehicle can be lowered to a speed at which the vehicle is in a stopped state at an appropriate speed by means of the emergency brake control with the anti-lock control even on the low-μ road with a low friction coefficient with a tire.

In the brake control method of the present embodiment, the ECU 2 performs the processing of the procedure of step S107 and thereafter only when the ECU 2 confirms that the occupant of the vehicle has operated the switch 3 while the vehicle is travelling by performing the processing of steps S101 and S103 in FIG. 6. In the brake control method of the present embodiment, it is possible to prevent the processing related to the prohibition of anti-lock control from being performed in a state other than a state during emergency brake control.

In the brake control method of the present embodiment, the ECU 2 determines the deceleration amount in the brake operation of the vehicle by multiplying the deceleration al in the brake operation of the vehicle and the operation time t1 of the brake operation of the vehicle. Further, the ECU 2 determines the acceleration amount in the brake release operation of the vehicle by multiplying the acceleration $\alpha 2$ in the brake release operation of the vehicle and the operation time t2 of the brake release operation of the vehicle. Both the deceleration amount in the brake operation of the vehicle and the acceleration amount in the brake release operation of the vehicle can be easily determined using values that can be detected or measured in the vehicle, known values, and the like.

Second Embodiment

In the first embodiment, the ECU 2 determines whether the occupant of the vehicle has operated the switch 3 while the vehicle is travelling, and if the ECU 2 determines that the occupant has operated the switch 3 while the vehicle is travelling, the ECU 2 determines whether the acceleration amount in the brake release operation of the vehicle is equal to or larger than the deceleration amount in the brake operation of the vehicle. However, the determination of whether the occupant has operated the switch 3 while the vehicle is travelling may be omitted. If the determination is omitted, the ECU 2 determines whether the acceleration amount in the brake release operation of the vehicle is equal to or larger than the deceleration amount in the brake operation of the vehicle, regardless of whether the switch 3 has been operated.

A brake control method according to a second embodiment of the present invention can be implemented using the configurations shown in FIGS. 1 and 2, similar to the brake control method of the first embodiment. However, in the brake control method of the second embodiment, the ECU 2 in FIG. 1 does not perform the procedure of steps S101 and S103 in FIG. 6, but performs the procedure of step S107 and thereafter. If the brake control method of the second embodiment is performed by the ECU 2 in FIG. 1 performing the procedure of step S107 and thereafter, the ECU 2 can constitute a brake control device according to the second embodiment of the present invention. The brake control method and brake control device according to the second embodiment can reduce a processing load of the ECU 2.

Third Embodiment

In the above-described embodiments, when the ECU 2 determines that the vehicle speed V is higher than the stop determination speed V1 and the vehicle is in a travelling state, the ECU 2 unconditionally determines whether the acceleration amount in the brake release operation of the vehicle is equal to or larger than the deceleration amount in the brake operation of the vehicle. However, the ECU 2 may determine whether the acceleration amount in the brake release operation of the vehicle is equal to or larger than the deceleration amount in the brake operation of the vehicle only when the vehicle speed V is lowered to a speed at which the creep torque T is generated.

The acceleration amount in the brake release operation of the vehicle is generated by the creep torque T generated by lowering of the vehicle speed V. If the vehicle speed V is not lowered to the speed at which the creep torque T is generated, the acceleration amount in the brake release operation of the vehicle is not generated. If the vehicle speed V is not lowered to the speed at which the creep torque T is generated, it becomes unnecessary for the ECU 2 to determine whether the acceleration amount in the brake release operation of the vehicle is equal to or larger than the deceleration amount in the brake operation of the vehicle by performing the processing of step S117 of FIG. 6.

Figure 7:
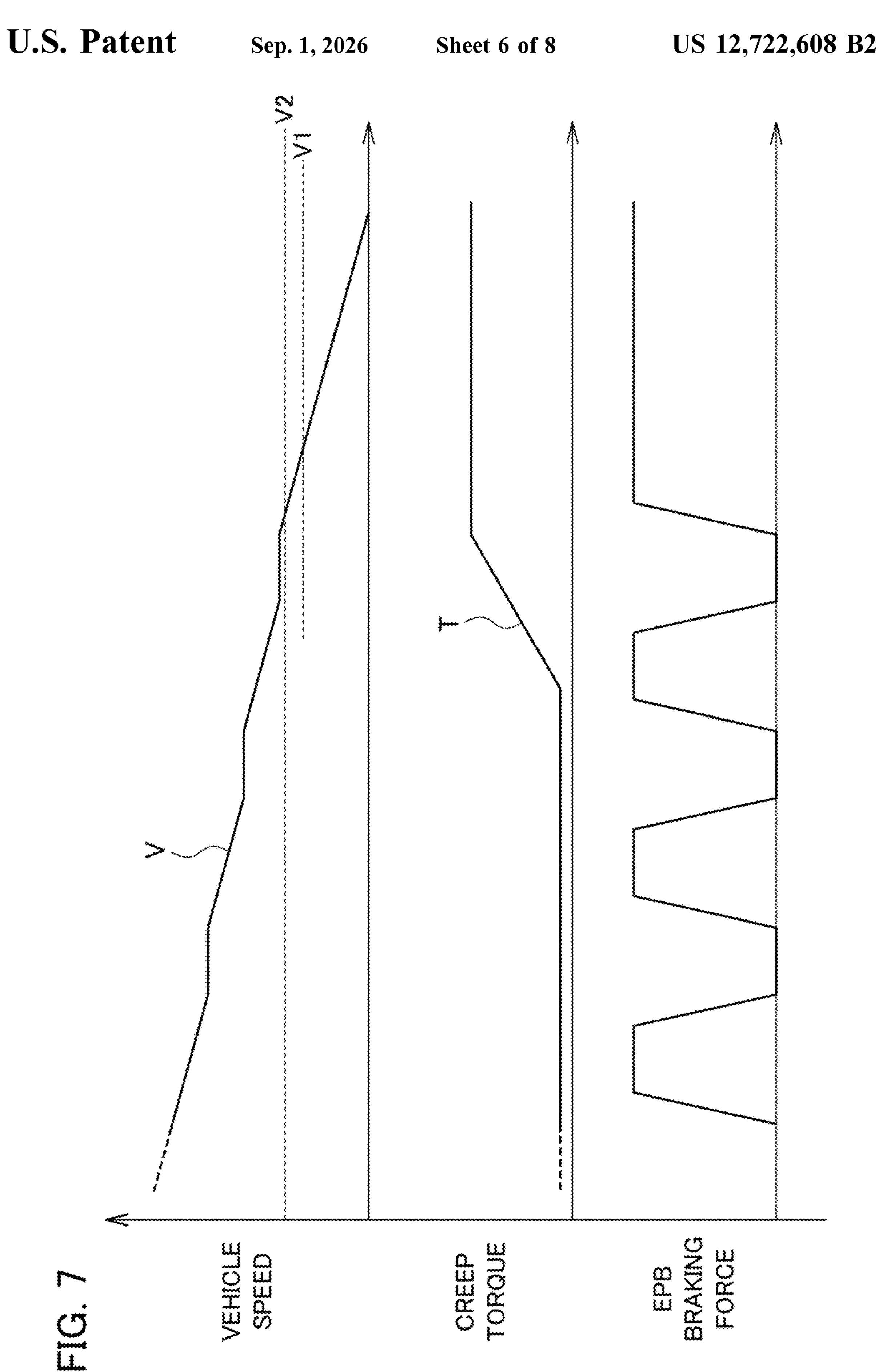
FIG. 7 is a graph showing an example of the time variation of a vehicle speed, a creep torque from a power train, and braking force by an emergency brake when the ECU in FIG. 1 performs anti-lock control by a brake control method of a third embodiment of the present invention during an emergency brake when a vehicle is travelling on a low-μ road.

A brake control method according to a third embodiment of the present invention can be implemented using the configurations shown in FIGS. 1 and 2, similar to the brake control methods of the first and second embodiments. However, in the brake control method of the third embodiment, the ECU 2 determines whether the vehicle speed Vis lower than a prescribed determination speed before determining whether the acceleration amount in the brake release operation of the vehicle is equal to or larger than the deceleration amount in the brake operation of the vehicle. The prescribed determination speed may be a reference speed V2 shown in the upper graph of FIG. 7, for example. FIG. 7 shows an example of a case where a road surface on which the vehicle is travelling is the low-μ road.

Figure 8:
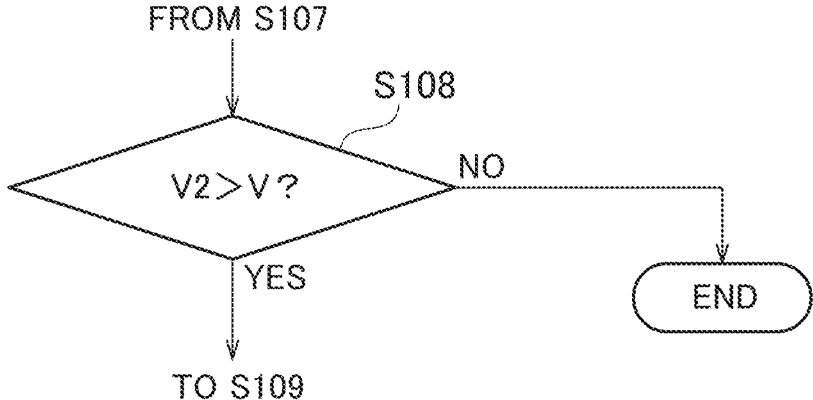
FIG. 8 is a flowchart showing a part of a procedure when the ECU in FIG. 1 performs the brake control method of the third embodiment.

The reference speed V2 is higher than a speed at which the creep torque T in the middle graph of FIG. 7 is generated in the vehicle. Determination of whether the vehicle speed V is lower than the reference speed V2 can be made by performing step S108 between steps S107 and S109 of FIG. 6, as shown in the flowchart of FIG. 8, for example.

If the vehicle speed Vis lower than the reference speed V2 (YES in step S108), the ECU 2 moves the processing to step S109 of FIG. 6, and alternatively if the vehicle speed V is not lower than the reference speed V2 (NO in step S108), the ECU 2 ends the series of processing. Only when the vehicle speed Vis lower than the reference speed V2, the ECU 2 determines whether the acceleration amount in the brake release operation of the vehicle is equal to or larger than the deceleration amount in the brake operation of the vehicle by performing the processing of step S117 of FIG. 6.

In the brake control method of the third embodiment, if the vehicle speed V is not lowered to the speed at which the creep torque T is generated, the ECU 2 omits the performance of the procedure necessary for the ECU 2 to determine whether the acceleration amount in the brake release operation of the vehicle is equal to or larger than the deceleration amount in the brake operation. The procedure to be omitted may be steps S109 to S115 in FIG. 6, for example. The ECU 2 of FIG. 1 may constitute a brake control device according to the third embodiment of the present invention when the brake control method of the third embodiment described above is performed. The brake control method and brake control device of the third embodiment can reduce a processing load of the ECU 2.

Fourth Embodiment

In the above-described embodiments, the ECU 2 determines whether the acceleration amount in the brake release operation of the vehicle is equal to or larger than the deceleration amount in the brake operation of the vehicle, regardless of whether a road surface on which the vehicle is traveling is the low-μ road or high-μ road. However, the ECU 2 may determine whether the acceleration amount in the brake release operation of the vehicle is equal to or larger than the deceleration amount in the brake operation of the vehicle, only when the road surface on which the vehicle is travelling is the low-μ road.

If the road surface on which the vehicle is travelling is the high-μ road, even if the vehicle speed V is lowered and the creep torque T is generated, the deceleration amount in the brake operation of the vehicle is larger than the acceleration amount in the brake release operation of the vehicle by the creep torque T. If the road surface on which the vehicle is travelling is the high-μ road, it becomes unnecessary for the ECU 2 to determine whether the acceleration amount in the brake release operation of the vehicle is equal to or larger than the deceleration amount in the brake operation of the vehicle by performing the processing of step S117 in FIG. 6.

Figure 9:
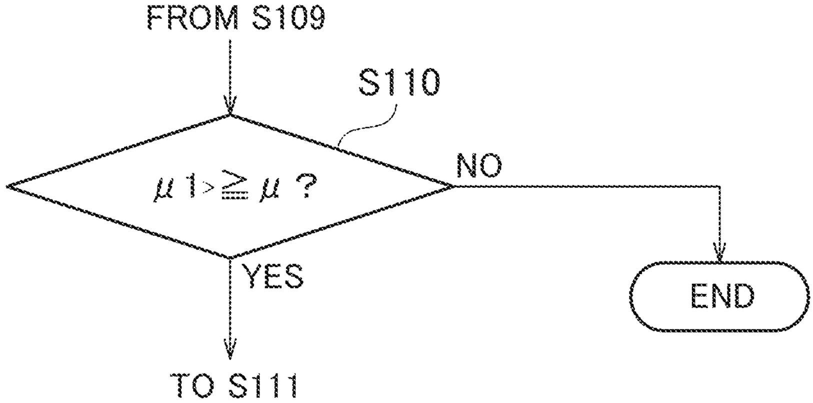
FIG. 9 is a flowchart showing a part of a procedure when the ECU in FIG. 1 performs a brake control method according to a fourth embodiment of the present invention.

A brake control method according to a fourth embodiment of the present invention can be implemented using the configurations shown in FIGS. 1 and 2, similar to the brake control methods of the first to third embodiments. However, in the brake control method of the fourth embodiment, the ECU 2 determines whether a friction coefficient μ of a travelling road surface is equal to or less than a reference friction coefficient μ1 as a prescribed threshold, before determining whether the acceleration amount in the brake release operation of the vehicle is equal to or larger than the deceleration amount in the brake operation of the vehicle. The reference friction coefficient μ1 is a friction coefficient that serves as a reference for determining whether the travelling road surface is the low-μ road or high-μ road. Determination of whether the friction coefficient μ of the travelling road surface is equal to or less than the reference friction coefficient μ1 can be made by performing step S110 between steps S109 and S111 in FIG. 6, as shown in the flowchart of FIG. 9, for example.

If the friction coefficient μ of the travelling road surface is equal to or less than the reference friction coefficient μ1 (YES in step S110), the ECU 2 determines that the acquired friction coefficient μ is equal to or less than the prescribed threshold, and moves the processing to step S111 in FIG. 6. If the friction coefficient μ of the travelling road surface is more than the reference friction coefficient μ1 (NO in step S110), the ECU 2 ends the series of processing. The ECU 2 determines whether the acceleration amount in the brake release operation of the vehicle is equal to or larger than the deceleration amount in the brake operation of the vehicle by performing the processing in step S117 of FIG. 6, only when the friction coefficient μ is equal to or less than the reference friction coefficient μ1.

In the brake control method of the fourth embodiment, if the friction coefficient μ is not small to the extent that the acceleration amount in the brake release operation of the vehicle is equal to or larger than the deceleration amount in the brake operation when the vehicle speed V is lowered, the ECU 2 omits a part of the procedure. The procedure to be omitted is a procedure necessary for the ECU 2 to determine whether the acceleration amount in the brake release operation of the vehicle is equal to or larger than the deceleration amount in the brake operation, and may be steps S111 to S115 in FIG. 6, for example. If the brake control method of the fourth embodiment described above is performed, the ECU 2 of FIG. 1 may constitute a brake control device according to the fourth embodiment of the present invention. The brake control method and brake control device of the fourth embodiment can reduce a processing load of the ECU 2.

Fifth Embodiment

In the above-described embodiments, when the ECU 2 determines that the acceleration amount in the brake release operation of the vehicle is equal to or larger than the deceleration amount in the brake operation by performing the processing in step S117 of FIG. 6, the ECU 2 prohibits the anti-lock control in step S121 of FIG. 6. However, the ECU 2 may restrict the anti-lock control during emergency braking instead of prohibiting the control.

A brake control method according to a fifth embodiment of the present invention can be implemented using the configurations shown in FIGS. 1 and 2, similar to the brake control methods of the first to fourth embodiments. However, in the brake control method of the fifth embodiment, when the deceleration amount in the brake operation of the vehicle is not larger than the acceleration amount in the brake release operation (NO in step S117 of FIG. 6), the ECU 2 restricts the anti-lock control instead of prohibiting the control.

Figure 10:
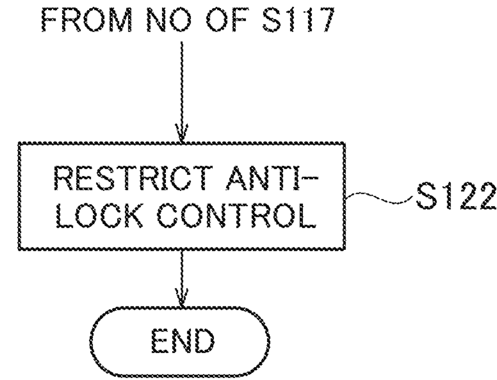
FIG. 10 is a flowchart showing a part of a procedure when the ECU in FIG. 1 performs a brake control method according to a fifth embodiment of the present invention.

When the ECU 2 determines that the acceleration amount in the brake release operation of the vehicle is equal to or larger than the deceleration amount in the brake operation by determining as NO in step S117 of FIG. 6, the ECU 2 changes contents to contents in which the anti-lock control is restricted as shown in FIG. 10 (step S122). The ECU 2 changes the anti-lock control contents in step S122 to restrict the anti-lock control. After contents are changed to the contents in which the anti-lock control during emergency braking is restricted in step S122, the ECU 2 ends the series of processing.

Figure 11:
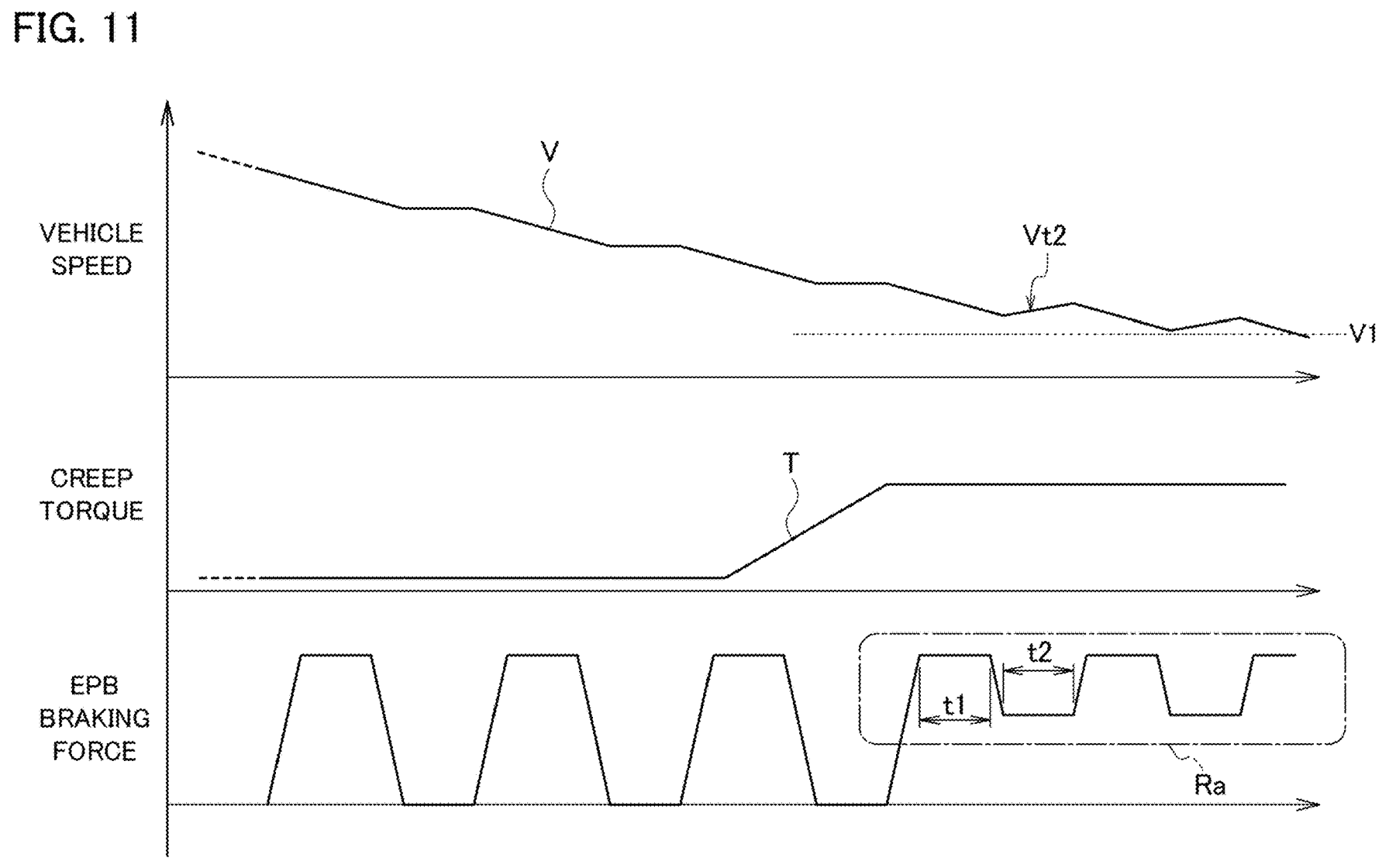

The anti-lock control can be restricted by reducing the brake release amount in the brake release operation compared to that when the anti-lock control is not restricted, for example. When the brake release amount in the brake release operation is reduced, the EPB braking force of the operation time t2 of the brake release operation which is lower than that of the operation time t1 of the brake operation is applied to rear two wheels of the vehicle, as shown in a restricted area Ra of the anti-lock control shown in the lower graph of FIG. 11. FIG. 11 shows an example of a case where a road surface on which the vehicle is travelling is the low-μ road.

In the brake control method of the fifth embodiment, the re-acceleration of the vehicle can be suppressed by the EPB braking force even if the acceleration amount in the brake release operation of the vehicle by the creep torque T shown in the middle graph of FIG. 11 is equal to or larger than the deceleration amount in the brake operation of the vehicle. A feature that the re-acceleration of the vehicle can be suppressed by restricting the anti-lock control can be made clear by comparing the vehicle speed V shown in the upper graph of FIG. 11 with the vehicle speed V shown in the upper graph of FIG. 4, for example.

In a portion of a brake release operation after generation of the creep torque T in the upper graph of FIG. 4 showing the vehicle speed V, the vehicle is re-accelerated by the generation of the creep torque T. With respect to the vehicle speed Vt2 of a portion of a brake release operation in the restricted area Ra of the anti-lock control shown in the upper graph of FIG. 11, the vehicle is re-accelerated by the generation of the creep torque T. However, in the restricted area Ra of the anti-lock control, the EPB braking force of the brake release operation is not set to zero, and therefore the magnitude of the re-acceleration is suppressed than that when the anti-lock control is performed.

Further, in the brake control method of the fifth embodiment, even if the anti-lock control is restricted, the EPB braking force during the brake release operation is lower than that during the brake operation, and therefore even if the anti-lock control is restricted, the lock can be released during the brake release operation.

In the fifth embodiment, the brake control method of the fifth embodiment is performed by the ECU 2 performing the processing of the procedure in which step S121 of FIG. 6 is replaced with step S122 of FIG. 10. When the brake control method of the fifth embodiment is performed, the ECU 2 of FIG. 1 can constitute a brake control device according to the fifth embodiment of the present invention. In the brake control method and brake control device of the fifth embodiment, it is possible to suppress the re-acceleration of the vehicle during the emergency brake control with the anti-lock control performed by the motor-driven parking brake device.

Each of the above described embodiments is an example of the present invention. Therefore, the present invention is not limited to each of the above described embodiments, and it is needless to say that various modifications can be made in accordance with the design or the like even in other embodiments other than the above described embodiments, as long as there is no deviation from the technical idea of the present invention.

REFERENCE SIGNS LIST

2 ECU (parking brake device, determining unit, and restricting unit)
3 Switch (parking brake device)
4 to 7 Wheel speed sensor (parking brake device)
8, 9 Actuator (parking brake device)
10 Motor
T Creep torque
T1 Torque threshold
t1 Brake operation time
t2 Brake release operation time
V Vehicle speed
V2 Reference speed (prescribed determination peed)
α1 Deceleration
α2 Acceleration
μ Friction coefficient
μ1 Reference friction coefficient (prescribed threshold)

The invention claimed is:

1. A brake control method comprising:

determining whether acceleration amount in a brake release operation of a vehicle is equal to or larger than deceleration amount in a brake operation of the vehicle when a parking brake device that is driven by a motor performs braking control with anti-lock control for alternately repeating the brake operation and the brake release operation while the vehicle is travelling; and restricting the anti-lock control from being performed when the acceleration amount is equal to or larger than the deceleration amount.

2. The brake control method according to claim 1, comprising:

determining whether a speed of the vehicle that is travelling is lower than a prescribed determination speed; and determining whether the acceleration amount is equal to or larger than the deceleration amount when the speed of the vehicle that is travelling is lower than the prescribed determination speed.

3. The brake control method according to claim 1, wherein the braking control with the anti-lock control is emergency brake control for braking the vehicle that is travelling due to an occupant of the vehicle operating the parking brake device.

4. The brake control method according to claim 3, comprising:

acquiring a friction coefficient of a road surface on which the vehicle travels when an emergency brake is actuated; and determining whether the acceleration amount is equal to or larger than the deceleration amount when the acquired friction coefficient is equal to or less than a prescribed threshold.

5. The brake control method according to claim 1, wherein the deceleration amount is obtained based on an operation time of the brake operation in one cycle of the anti-lock control and a deceleration in the brake operation of the vehicle.

6. The brake control method according to claim 1, wherein the acceleration amount is obtained based on an operation time of the brake release operation in one cycle of the anti-lock control and an acceleration in the brake release operation of the vehicle.

7. The brake control method according to claim 1, wherein the anti-lock control is restricted by reducing the brake release amount in the brake release operation compared to the brake release amount when the anti-lock control is not restricted.

8. A brake control device comprising:

a microcomputer including a central processing unit, a non-transitory memory, and an output unit, wherein the microcomputer is configured to:

determine whether acceleration amount in a brake release operation of a vehicle is equal to or larger than deceleration amount in a brake operation of the vehicle when a parking brake device that is driven by a motor performs braking control with anti-lock control for alternately repeating the brake operation and the brake release operation while the vehicle is travelling; and restrict the anti-lock control from being performed when the acceleration amount is equal to or larger than the deceleration amount.

* * * * *